Aug. 12, 1924.

W. T. SEARS 1,504,842

CONTROLLING PEDAL MECHANISM

Filed Feb. 2, 1921

Inventor
W. T. Sears.
By his Attorney
R H Strother

Aug. 12, 1924.
W. T. SEARS
1,504,842
CONTROLLING PEDAL MECHANISM
Filed Feb. 2, 1921    3 Sheets-Sheet 2
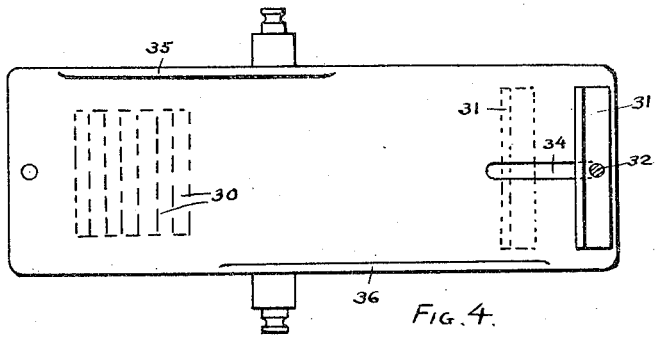
FIG. 4.
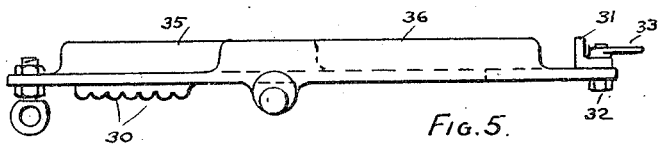
FIG. 5.
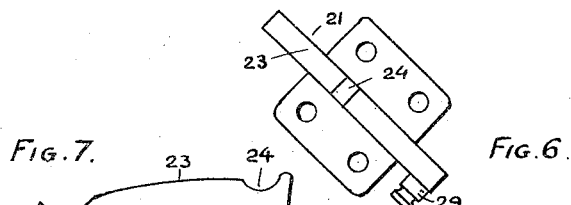
FIG. 6.
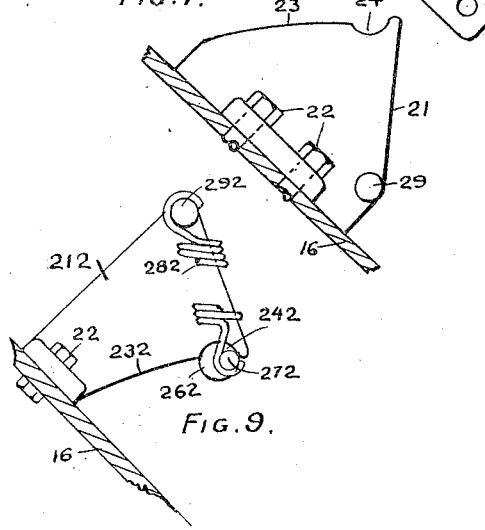
FIG. 7.
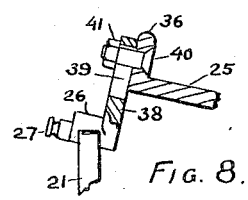
FIG. 8.
FIG. 9.
Inventor
W. T. Sears
R. H. Strother.
By his Attorney

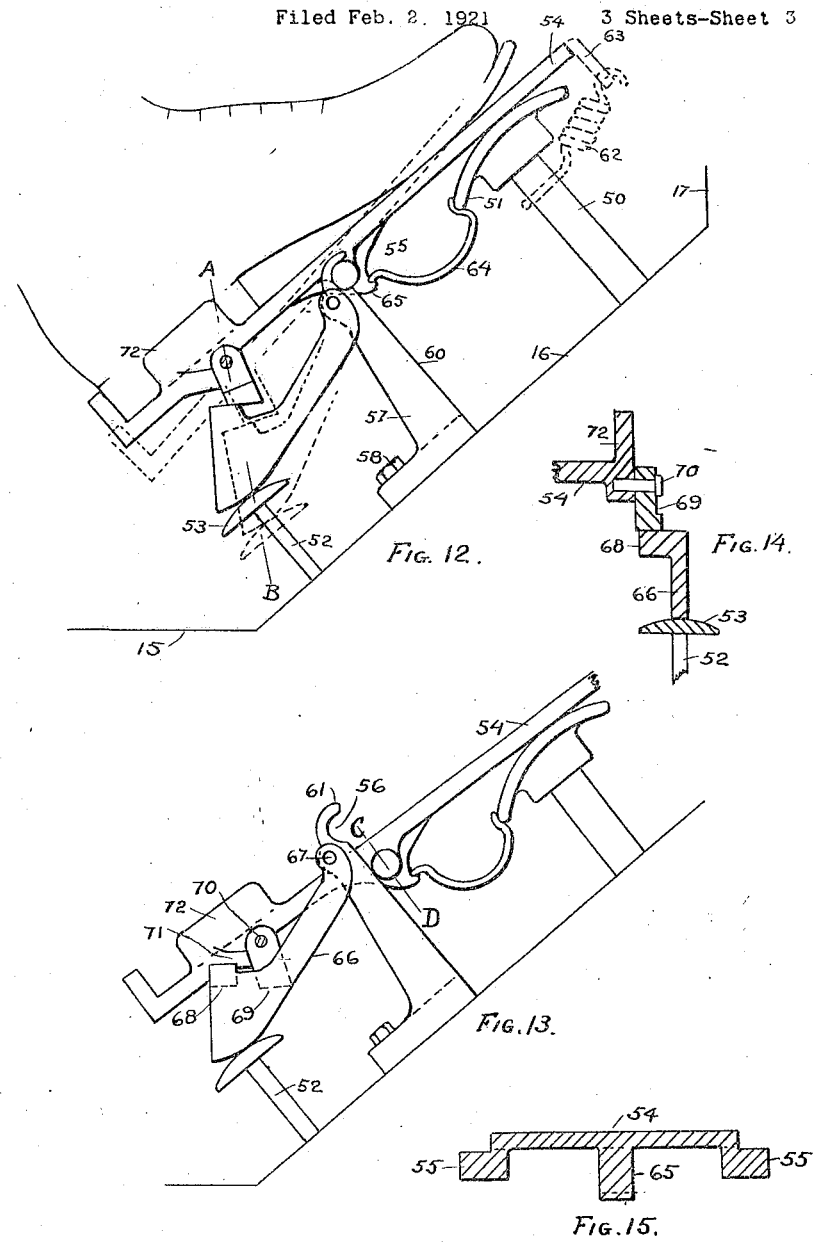

Patented Aug. 12, 1924.

1,504,842

UNITED STATES PATENT OFFICE.

WILLARD T. SEARS, OF MONTCLAIR, NEW JERSEY; MABEL HELENA SEARS EXECUTRIX OF SAID WILLARD T. SEARS, DECEASED.

CONTROLLING-PEDAL MECHANISM.

Application filed February 2, 1921. Serial No. 441,796.

*To all whom it may concern:*

Be it known that I, WILLARD T. SEARS, a citizen of the United States, residing at Montclair, New Jersey, have invented certain new and useful Improvements in Controlling-Pedal Mechanism, of which the following is a specification.

My invention relates to controlling pedal mechanism especially designed for the foot-control of an automobile, and it has for its object to provide certain improvements in devices of this character. My invention is designed to afford control by a single pedal of functions which, heretofore, have usually required more than one pedal.

My invention consists in certain features of construction and combinations and arrangements of parts, all of which will be fully described herein and particularly pointed out in the claims.

The present invention, as to some of the features thereof, may be regarded as an improvement on the pedal mechanism which constitutes the subject matter of my prior Patent No. 1,307,794, dated June 24, 1919.

My invention is illustrated in the accompanying drawings, in which—

Fig. 4 is a top view, and Fig. 5 is a side view of the pedal detached.

Fig. 6 is a plan, and Fig. 7 is a side elevation of one of the brackets upon which the pedal is mounted.

Fig. 8 is a fragmentary sectional view of the left hand part of the pedal, the left hand bracket and an adjustable trunnion whereby the degree of lateral tilting of the pedal can be regulated.

Fig. 9 is a side elevation showing a modified form of supporting bracket.

Fig. 12 is a side elevation of another form of my invention, the parts being shown by full lines in normal position and by broken lines in position to operate the accelerator.

Fig. 13 is a similar view but showing the parts in position to apply the brake.

Fig. 14 is a fragmentary view in section on line AB of Fig. 12.

Fig. 15 is a cross section of the pedal on line CD of Fig. 13.

Figure 1:
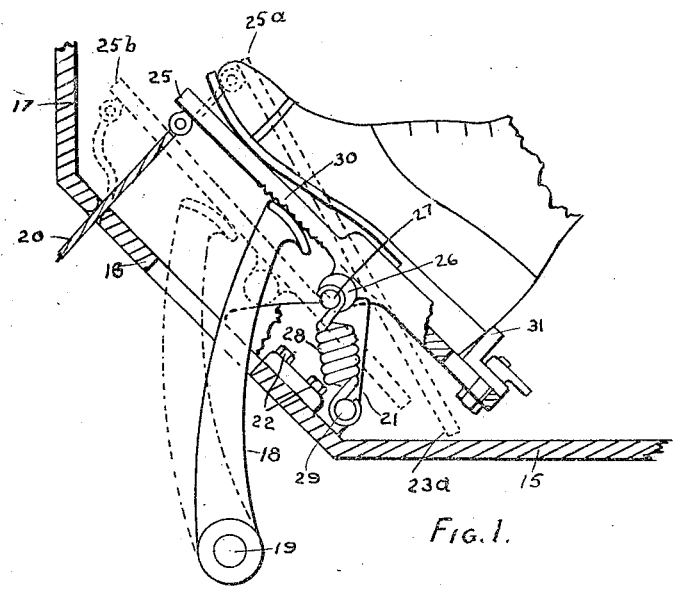
Fig. 1 is a side elevation, partly in section, of a pedal and associated devices.

In the form of the invention shown in Figs. 1 to 7 inclusive, 15 represents the floor board of an automobile, 16 the foot board and 17 the dash board. 18 is the brake lever of the car pivoted at 19. 20 represents a cable or other flexible connection to the throttle of the engine, so connected thereto that a pull on said cable opens the throttle and when the tension on the cable is relaxed, the throttle is automatically closed as by a spring. This is what is commonly called the accelerator connection.

Two brackets 21 are fastened as by bolts or screws 22 to the foot board 16, one at the right and one at the left of the brake lever 18 and somewhat forward at said lever. Each of these brackets has an upper edge 23 and, near the forward extremity of said edge, a shallow bearing depression 24, Fig. 7.

The controlling pedal 25 has on each side thereof a pivot or trunnion 26 which normally rests in the bearing or depression 24. Each trunnion has projecting from the end thereof a grooved pin 27 to which is connected one end of a tension spring 28, the other end of which is connected to another grooved pin 29 projecting from the side of the bracket 21 at the lower forward corner of said bracket. The construction is such that when the foot rests upon the pedal as in Fig. 1 a tilting of the foot downward at the heel and upward at the toe rocks the pedal 25 about the trunnions 26 as a pivot to some such position as that indicated in broken lines at 25ª. It will be perceived that the result of this motion is to pull the cord 20 and open the throttle; and of course the extent to which the throttle is opened will depend upon the extent to which the pedal is rocked. It will be perceived that the weight of the foot and leg can rest comfortably on the pedal whether the throttle is open or closed, and in whatever position the pedal may be rocked to. The extent to which the throttle is opened depends solely upon the angle at which the pedal and foot are held, and the foot rests comfortably on the pedal at any angle that would occur in practice.

Figure 2:
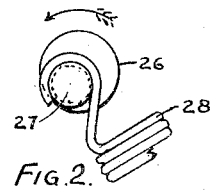
Fig. 2 is a detail, on a larger scale, of a pivot or trunnion and its attached spring.
Figure 3:
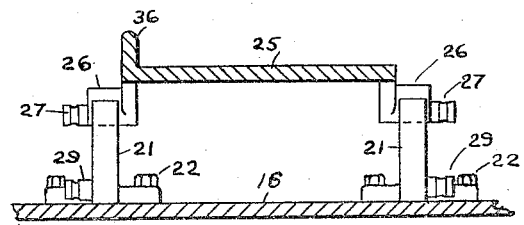
Fig. 3 is a cross-section of the pedal back of its pivot and showing the brackets in elevation.

In order to give the spring 28 a tendency to rock the front end of the pedal downward, the pin 27 is placed eccentrically of the trunnion 26, so that said spring has a tendency to rock said trunnion in the direction of the arrow in Fig. 2. The principal purpose of this arrangement is to hold the pedal down on the brake lever 18 so as to prevent rattling when the foot is off the pedal.

The brake is applied by straightening the leg and pushing forward on the pedal as a whole. The natural instinctive impulse of a person sitting in a vehicle and confronted with an instant necessity of stopping, is to brace himself backward from his feet and this impulse results in pushing the pedal forward. The trunnions 26 are thus forced out of their shallow bearings 24, and are slid forward along the edges 23 of the brackets 21, to some such position as that shown by broken lines at 25$^b$ in Fig. 1. This motion of the pedal has two effects, namely, it operates the brake lever 18, and relieves any tension there may have been on the cable 20, thus by one motion applying the brake and closing the throttle, at least in so far as the throttle is controlled by the pedal. The sliding forward of the trunnions 26 along the edges 23, stretches the springs 28, and when the pressure of the foot is relieved, said springs draw said trunnions back into the bearings 24 and so restore the pedal to normal condition. These springs thus perform the function of restoring the pedal after an application of the brake and holding said pedal releasably in its bearings, and they also serve to hold said pedal down on the brake lever to prevent rattling.

In order to lessen or to overcome any tendency of the pedal to slip on the end of the brake lever 18, I have in the present instance provided said pedal on its underside with transverse corrugations 30, or equivalent unevennesses. This is of advantage in some cars, although in other cars, where the required direction of motion is different, it may not be useful.

The guiding edge 23 of each bracket 21, is preferably made on a curve approximately parallel to the direction of motion of the end of the lever 18 where the latter makes contact with said pedal. This enables the brake to be applied with little or no sliding of the pedal over the end of the brake lever. In the particular case illustrated in Fig. 1, this direction is about horizontal; but it varies in cars of different makes, and the brackets can be varied in form accordingly. In some instances it may be preferable to make the bracket like that shown at 212 in Fig. 9. In this form of bracket, the slideway consists of the lower edge 232 of the bracket, the bearing depression 242 faces downward, and the pin 292 for the spring 282 is in the upper corner of the bracket. The spring 282 is stiff enough to withstand the ordinary pressure of the foot, but yields and allows the trunnions to slide forward and downward along the way 232 when extra pressure is applied to operate the brake. Other variations in the form of bracket can of course be resorted to to fit different conditions.

As more clearly shown in Figs. 1, 4 and 5, the pedal is provided with a heel-rest 31 to position the driver's foot lengthwise of the pedal. The form of this heel-rest or stop can of course be varied considerably. That shown consists of a piece of angle metal. Obviously, the best position of the foot, lengthwise of the pedal, will depend upon the length of the foot, and I have accordingly made this stop adjustable. To this end it is fastened to the pedal by means of a bolt 32 and wing-nut 33, said bolt passing through a longitudinal slot 34 in the pedal. This heel-stop is shown in the drawing adjusted to the rear end of the slot to suit a long foot, and in Fig. 4 is shown in broken lines adjusted forward for a shorter foot. This heel rest adds greatly both to the comfort and to the safety of the device as it keeps the foot in proper position to control the accelerator. The construction is such that it can be adjusted in a moment to suit the driver.

I have also shown the pedal made with an upstanding flange 35 along the right hand forward edge thereof. This prevents the driver from unconsciously getting his foot from a position over the brake lever where it would be inconvenient to apply full braking pressure. There is another raised part or flange 36 on the left hand rear part of the pedal to prevent too great heel movement. The pedal is so made that a reasonable amount of foot movement is allowed for the comfort of the driver. It is necessary to limit the forepart or ball of the foot to prevent its ever getting into an unhandy braking position, but without limiting the ease of operation or decreasing its safety function the width of the pedal at the heel support can be made considerably greater than the part directly over the brake lever and thus give a wide range of foot positions. The disposition of the guide flanges, 35, 36 and 31, can be varied within limits indicated.

Another matter affecting the comfort of the driver is connected with the fact that in many cases when sitting at the steering-wheel and with his foot on the pedal it is not natural to have the foot flat in a right and left direction. In most cars the pedal is worked with the right foot and in many cases, especially where the distance between the steering-wheel and the brake pedal is short or when the driver is exceptionally tall the knee is thrown toward the right to clear the steering wheel and this tends to throw the foot into an inclined position; in fact, even aside from the conditions just mentioned when the foot is resting on a pedal, its natural position is somewhat inclined rather than perfectly flat.

Figure 10:
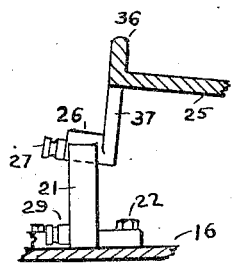
Figs. 10 and 11 are fragmentary sectional views illustrating different modified means for giving a lateral inclination or tilt to the pedal.

In order to provide for a lateral tilting of the foot, various expedients can be resorted to and some of these are illustrated in the drawing. For example, in Fig. 10, I have shown the trunnion pin 26 connected with the body of the pedal 25 by an elevated bracket 37 which throws the left side of the pedal a little higher than the right side.

Figure 11:
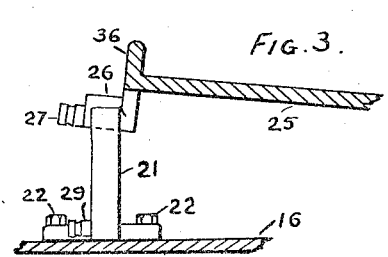

In Fig. 11 I have shown the left hand bracket 21 made taller than the right hand bracket, thus throwing the pedal 25 into an inclined position. The same thing could be accomplished by blocking up the left hand pedal above the foot board 16. In carrying out this method, however, it is necessary to take care to keep the curved slideway 23 in proper relation to the motion of the upper end of the brake lever 18.

My preferred means, however, for accomplishing this tilting of the pedal is shown in Fig. 8 where the pin 26 is not made integral with the pedal 25, but is part of a separate piece 38 which is connected with the pedal with provision for adjustment whereby it can be arranged to suit the person who uses the car. This can be accomplished in a variety of ways. As here shown, the piece 38 has a vertical slot 39 therein and a bolt 40 passes through the flange 36 and through said slot 39 and has a nut 41 which, when loosened, allows the adjustment to be made and which when tightened preserves it. In place of clamping this pedal in a fixed inclined position, relatively to the trunnion axis it can be so constructed that it will pivot on the trunnion and adjust itself automatically to whatever foot angle the driver may prefer or find the most comfortable. It should preferably have a spring or be so balanced that when the foot is removed the pedal will set itself to a definite position. So far as I am aware I am the first to provide any controlling pedal of this general character which can be rocked to control the machine with means for adjusting it to regulate the lateral tilt or incline of the pedal.

One advantage of the described construction of pedal and its supports is that it can be very readily applied to cars that have already been built and are in use. Such cars have usually been made with an accelerator pedal and a brake pedal arranged side by side. The accelerator pedal can be removed and my brackets 21 can be fastened to the footboard in the proper relation to the brake pedal, and a connection to the throttle can readily be made, either by means of the cable shown or by other suitable means.

Another form of my invention is illustrated in Figs. 12 to 15, inclusive. This is shown applied to a car in which the brake is operated by a plunger 50 having the usual head 51 on its top; and the accelerator is operated by a smaller plunger 52 having a head 53 thereon; and both plungers move approximately perpendicular to foot-board 16. Said plungers are depressible and are spring returned. The pedal 54 has trunnions 55, normally seated in shallow bearings 56 (Fig. 13) in brackets 57 secured by bolts 58 to the foot-board 16. The rear edge 60 of each of the brackets, is substantially parallel to the plungers 50 and 52. Each bracket 57 has an overhang 61 at its upper end, to prevent the trunnions 55 from accidentally rising above the bearings 56.

The pedal may be controlled by spring means which may advantageously consist of a single spring connecting the pedal and the brake plunger 50, and acting to press the pedal lengthwise toward the left in Fig. 12, but with its line of force at a suitable distance below the point where the pedal rests on the head 51. I have shown in broken lines in Fig. 12, a tension spring 62 connected at one end to the plunger 50 below head 51, and at the other end to a pin or bracket 63 projecting downward from the forward end of the pedal. This spring holds the trunnions 55 in their bearing seats 56 when the pedal is idle; and when the pedal is being tilted as shown in broken lines to operate the accelerator, said spring both holds the trunnions in their seats and also tends to restore the pedal to its normal position shown in full lines.

When the pedal is in contact with the head 51, the spring tends to move the pedal bodily toward the left and also by its reactions on the head 51 and on the brackets 57, it tends to rock the rear or lower end of the pedal upward about the head 51 as a fulcrum. When said pedal is moved to the braking position as shown in Fig. 13, the spring tends to cause trunnions 55 to slide upward along the surfaces 60 and back into their seats 56. In short, this one spring tends to hold the pedal in its normal position and also to restore it to normal from either of its two operated positions.

I have shown in full lines in Figs. 12 and 13 an alternative form of spring 64, whose action is much the same as the described action of spring 62. This spring connects the head 51 with a lug 65 projecting downward from the middle of pedal 54. This is a compression plate spring, and its line of force is in a similar position and acts in a similar direction to spring 62; that is to say, its line of force is in the general direction of the length of the pedal, and at a suitable distance below trunnions 55 and and the point of contact of the pedal with head 51.

The pedal is so connected with the accelerator plunger 52, that, when the driver's heel is depressed to rock the pedal about its trunnions, said plunger is depressed, but when the pedal is pushed bodily downward to operate the brake, the connection with the accelerator is broken. The form of connection shown in the drawing, comprises a lever 66, pivoted at 67 to the outside of one of the brackets 57, and resting at its free end on the head 53 of the plunger 52. The lever 66 has a lug 68 projecting toward pedal 54. A dog 69 is pivoted at 70 to the side of the pedal and normally rests on lug 68, as shown in Figs. 12 and 14. A lug 71 projects from the pedal in position to limit the swinging of the dog 69 about its pivot in one direction. When the heel is depressed as shown in broken lines in Fig. 12, the dog 69 depresses the lever 66 and accelerator plunger 52; but when the pedal is bodily depressed to operate the brake as shown in Fig. 13, said pedal moves a little forward, this motion being necessitated by the trunnions 55 moving out of their seats 56. In this forward motion of the pedal, the lug 71 carries the dog 69 forward and pushes it off the lug 68, thus entirely disconnecting the pedal from the accelerator and allowing the latter to return instantly to its normal or cut-off position. It is to be noted that the accelerator is thus instantly disconnected, whether the brake is applied from the normal, full line position of Fig. 12, or from the running position shown in broken lines. Even if the accelerator is pushed down at the time, a push on the forward part of the foot to apply the brake, moves the trunnions 55 out of their seats, and moves the dog 69 off the lug 68. When the pedal is depressed bodily to operate the brake, the trunnions 55 move down the surface 60 as in the other forms of the invention. It will be understood, of course, that said trunnions are not necessarily always in contact with said surfaces 60. When the pressure on the foot is relaxed and the pedal is allowed to return to normal position, the dog 69 can yield about its pivot to let the pedal come back to normal, after which said dog will drop back over the lug 68.

In order to prevent the heel of the driver from ever getting into position to operate the lever 66 directly, I may make a flange or guard 72 on the side of the pedal next to said lever.

In some cases I may dispense with the lever 66 and pivoted dog 69, and merely extend the plunger 52 to a suitable height by the side of the pedal, and put a lug on the side of said pedal, normally resting on the top of said plunger. In this case the plunger need not have the head 53. With this construction, plunger 52 is depressed directly by said lug, and when the brake is applied, said lug slides rearward off of the plunger, thus entirely breaking the connection of the pedal with the accelerator.

It will be noted that in the form last described and in the form shown in Fig. 12 to 15, inclusive, the invention comprises (*a*) an oscillating pedal whose oscillating movement controls the accelerator, (*b*) a brake connection on which the pedal is carried or which is in the path of bodily movement of the pedal, and (*c*) a fixed abutment which positively causes a disconnection of the pedal from the accelerator when the bodily braking movement is imparted to the pedal.

The invention is capable of many variations in details within the principle described.

Certain of the features shown in and described in connection with Figs. 1–11 of the drawing, are not claimed herein but are claimed in a divisional application filed Dec. 12, 1922, Serial No. 606,355.

Having thus described my invention, what I claim as new and desire to secure by Letters Patent is:

1. In apparatus of the class described, the combination of a pedal and a fixed support for said pedal, said pedal having a pivotal motion about one part of said support and a bodily sliding motion along said support; a controlling device operated by the pivotal motion of said pedal, and another controlling device operated by the sliding motion of said pedal.

2. In apparatus of the class described, the combination with an accelerator connection and a brake connection, of a pedal and a fixed support, said pedal having a pivotal motion about one part of said support and sliding motion along said support, said accelerator connection being operated by the pivotal motion of said pedal and said brake connection being operated by the sliding motion of said pedal.

3. In apparatus of the class described, the combination with two controlling devices, of a pedal and its support, said pedal having a pivotal and a sliding connection with said support, one of said connections being operated by a pivotal motion of said pedal from normal position and the other of said connections being operated by a bodily sliding motion of said pedal, said bodily sliding motion being such as to neutralize said pivotal motion, so that an operation of the second mentioned connection restores the first mentioned connection.

4. In apparatus of the class described, the combination with an accelerator connection and a brake connection, of a pedal, brackets on which said pedal is mounted, said brackets having each a pivotal bearing and a slideway for said pedal, and a restoring spring acting to hold said pedal in its pivotal bearing and to restore it after it has been moved along said slideway, said accelerator connection being operated by a pivotal motion and said brake connection by a sliding motion of said pedal.

5. In apparatus of the class described, the combination with two controlling devices, one of which is a lever, of a pedal and its supports, said pedal being pivoted to operate one of said devices and having sliding motion to operate said lever, and said supports having guideways for said sliding motion, said guideways being approximately parallel to the direction of motion of said lever where the latter is engaged by said pedal.

6. In apparatus of the class described, the combination of an oscillating and bodily movable pedal, an accelerator connection operated by the oscillating motion of said pedal, a brake connection operated by the bodily motion of said pedal, and means for positively disconnecting the accelerator when the pedal is moved bodily to apply the brake.

7. In apparatus of the class described, the combination of an oscillating and bodily movable pedal, an accelerator connection operated by the oscillating motion of said pedal, a brake connection operated by the bodily motion of said pedal, and a fixed abutment acting positively to disconnect the accelerator from the pedal when the brake is applied.

8. In apparatus of the class described, the combination of an oscillating and bodily movable pedal, an accelerator connection operated by the oscillating motion of said pedal, a brake connection operated by the bodily motion of said pedal, and a fixed abutment which guides the pedal in its bodily movement so as to move it positively out of connection with the accelerator.

9. In apparatus of the class described, the combination of a pedal having a pivot with a shallow bearing, an accelerator connection operated by a rocking of said pedal about said pivot, a brake connection, and a spring connected at one end to said pedal and at its other end to said brake connection and having its line of force so directed that said spring holds said pedal down on the brake connection, holds said pivot in said bearing, and restores said pedal when displaced from said bearing.

10. In apparatus of the class described, the combination of a pedal having trunnions, brackets on which said trunnions bear, said brackets having shallow depressions in which said trunnions have a pivotal bearing and said brackets having also guideways along which said trunnions can slide, and two controlling connections operated one by the pivotal and the other by the sliding motion of said pedal.

In testimony whereof, I, WILLARD T. SEARS, have signed my name to this specification, in the presence of two subscribing witnesses, this 27th day of Jan. 1921.

WILLARD T. SEARS.

Witnesses:
ARLO WILSON,
GEORGE HARTER.